(12) United States Patent
Fonseca et al.

(10) Patent No.: US 12,189,387 B2
(45) Date of Patent: Jan. 7, 2025

(54) OBJECT UNCERTAINTY MODELS TO ASSIST WITH DRIVABLE AREA DETERMINATIONS

(71) Applicant: Zoox, Inc., Foster City, CA (US)

(72) Inventors: Rasmus Fonseca, Boulder Creek, CA (US); Marin Kobilarov, Mountain View, CA (US); Mark Jonathon McClelland, San Francisco, CA (US); Jack Riley, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 471 days.

(21) Appl. No.: 17/247,047

(22) Filed: Nov. 25, 2020

(65) Prior Publication Data

US 2022/0163966 A1 May 26, 2022

(51) Int. Cl.
G05D 1/00 (2024.01)
B60W 60/00 (2020.01)

(52) U.S. Cl.
CPC ......... G05D 1/0088 (2013.01); G05D 1/0214 (2013.01); *B60W 60/0027* (2020.02); *G05D 1/0221* (2013.01)

(58) Field of Classification Search
CPC .. G05D 1/0088; G05D 1/0214; G05D 1/0289; G05D 2201/0213; B60W 60/0027; B60W 2554/4049
See application file for complete search history.

(56) References Cited

U.S. PATENT DOCUMENTS

| 2017/0329332 A1* | 11/2017 | Pilarski | B60W 30/0956 |
|---|---|---|---|
| 2019/0011912 A1* | 1/2019 | Lockwood | G05D 1/0044 |
| 2019/0317520 A1 | 10/2019 | Zhang et al. | |
| 2020/0110416 A1* | 4/2020 | Hong | G05D 1/0221 |
| 2020/0150665 A1 | 5/2020 | Refaat et al. | |
| 2020/0160550 A1 | 5/2020 | Hunt | |
| 2020/0174481 A1 | 6/2020 | Van Heukelom et al. | |
| 2020/0257308 A1 | 8/2020 | Herman | |

(Continued)

FOREIGN PATENT DOCUMENTS

| DE | 102019110759 A1 | 11/2019 |
|---|---|---|
| EP | 3474254 A1 | 4/2019 |
| KR | 20200127019 | 11/2020 |

OTHER PUBLICATIONS

Office Action for U.S. Appl. No. 17/247,048, mailed on Jan. 19, 2023, Fonseca, Object Uncertainty Models , 43 pages.

(Continued)

*Primary Examiner* — Adam R Mott
*Assistant Examiner* — Mohammed Yousef Abuelhawa
(74) *Attorney, Agent, or Firm* — Lee & Hayes, P.C.

(57) ABSTRACT

Techniques for representing sensor data and predicted behavior of various objects in an environment are described herein. For example, an autonomous vehicle can represent prediction probabilities as an uncertainty model that may be used to detect potential collisions, define a safe operational zone or drivable area, and to make operational decisions in a computationally efficient manner. The uncertainty model may represent a probability that regions within the environment are occupied using a heat map type approach in which various intensities of the heat map represent a likelihood of a corresponding physical region being occupied at a given point in time.

20 Claims, 7 Drawing Sheets

(56) References Cited

U.S. PATENT DOCUMENTS

| | | |
|---|---|---|
| 2020/0290604 A1 | 9/2020 | Kim |
| 2021/0046954 A1* | 2/2021 | Haynes |
| 2021/0064040 A1* | 3/2021 | Yadmellat ............ G05D 1/0214 |
| 2021/0149404 A1 | 5/2021 | Zeng et al. |
| 2021/0237769 A1* | 8/2021 | Ostafew ................ G08G 1/042 |
| 2021/0362743 A1 | 11/2021 | Zhu |
| 2021/0380099 A1 | 12/2021 | Lee et al. |
| 2022/0063662 A1 | 3/2022 | Sprunk et al. |
| 2022/0163966 A1 | 5/2022 | Fonseca et al. |

OTHER PUBLICATIONS

PCT Search Report and Written Opinion mailed Sep. 1, 2022 for PCT Application No. PCT/US21/72274, 9 pages.

Office Action for related U.S. Appl. No. 17/247,048, entitled "Object Uncertainty Models," mailed on Aug. 10, 2023 (54 pages).

Office Action for U.S. Appl. No. 17/247,048, mailed on Apr. 25, 2023, Fonseca, "Object Uncertainty Models ", 58 pages.

\* cited by examiner

OBJECT UNCERTAINTY MODELS TO ASSIST WITH DRIVABLE AREA DETERMINATIONS

BACKGROUND

Autonomous vehicles may navigate along routes. For example, when the autonomous vehicles receive requests to travel to destination locations, the autonomous vehicles may navigate along routes from the current locations of the autonomous vehicles to a pickup location to pick up a passenger and/or from the pickup location to the destination locations. While navigating, the autonomous vehicles may detect other objects in the environment and predict their behavior. Maintaining and updating uncertainty associated with the predicted behavior of each detected object is computationally expensive and may create challenges for the vehicle to safely navigate through the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
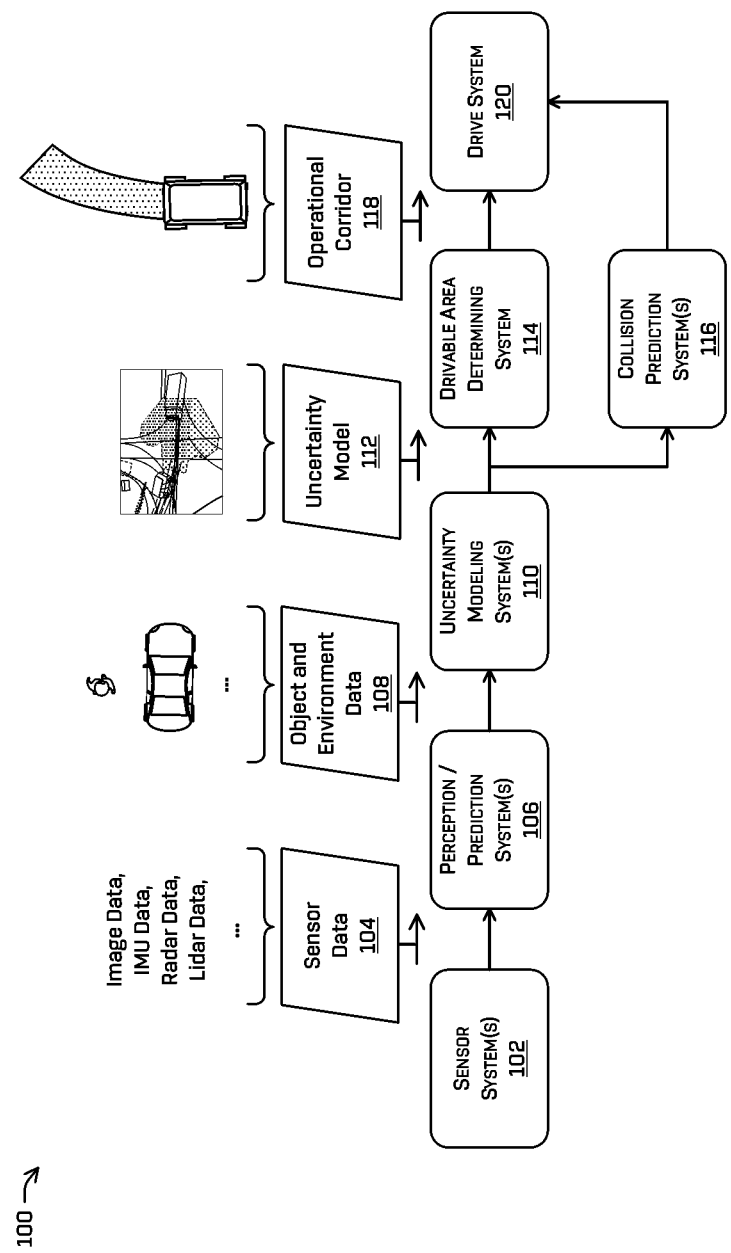
FIG. 1 is an example block-diagram illustrating an example architecture associated with operational decisions of an autonomous vehicle, in accordance with embodiments of the disclosure.

As discussed herein, autonomous vehicles may navigate through physical environments. For example, when an autonomous vehicle receives a request to travel to a destination location, the autonomous vehicle may navigate along a reference trajectory or route from the current location of the autonomous vehicle to a pickup location to pick up a passenger and then from the pickup location to the destination location. While navigating, the autonomous vehicle may encounter dynamic objects (e.g., vehicles, pedestrians, animals, and the like), static objects (e.g., buildings, signage, parked vehicles, and the like) in the environment. In order to ensure the safety of the occupants and objects, the system and vehicle, discussed herein, may employ safety or risk thresholds when operating in the environment.

In some cases, the autonomous vehicles may operate based on sensor data collected by one or more sensors. The autonomous vehicles may utilize the sensor data to detect, classify, and track objects in the environment. The detected objects and characteristics of those objects (e.g., distance from autonomous vehicle, type or class of object, velocity, heading or direction of travel, etc.) as well as the location or position of the objects within the environment in addition to structures, elements, surfaces, and the like may be generally referred to herein as perception data as well as other environmental data captured by one or more sensors associated with the autonomous vehicle. In general, the autonomous vehicle may utilize the perception data to predict future behaviors of the objects in the environment. The perception data and the predictions may, in some instances, have uncertainty associated with them (e.g., the object may have a range of predicted movements or trajectories). In some cases, the perception data and the predictions are used to generate an uncertainty model that may be utilized to determine drivable areas and/or predict and prevent potentially collisions Autonomous vehicles may maintain a list of each object or agent within a distance of the vehicle. The vehicle may then predict, update, and track both the predicted behavior of the object and the uncertainty (or certainty) associated with the predicted behavior. The vehicle may then perform operations associated with checking each object's position, predicted behavior with one or more safety thresholds (such as a minimum distance threshold) and, based on the results of the checks, modify the operations of the vehicle to avoid unsafe situations. However, often in crowded or busy areas, the number of calculations required to predict behavior and check distances associated with each object on a large list of objects can exceed millions of operations per second. The techniques, as discussed herein, may reduce the overall number of operations performed by the vehicle by fusing the uncertainty data of each object of the list of objects into a single uncertainty model representing the physical environment around the vehicle, such that the vehicle may consume the uncertainty model when making operational decisions rather than preforming calculations for each individual object.

In one implementation, the uncertainty model may be represented as a heatmap in which each cell or pixel of the heatmap defines a probability that the cell is occupied in the future. In some cases, the uncertainty model may include multiple models. In these cases, each uncertainty model may represent the physical environment at a predetermined period of time. For example, the uncertainty models may each represent the environment at a periodic interval (such as every second). In this example, each successive uncertainty model may represent the physical environment one second following the preceding model.

For example, A heat map can represent a discretized region of the environment proximate to the autonomous vehicle. For example, the heat map can represent a 64×64 grid (or J×K sized grid) representing a 100 meter by 100 meter region around the autonomous vehicle. Of course, the heat map can represent any size of region and can represent any number of discrete portions of the region. In some cases, a portion of the heat map can be referred to as a cell of the heat map. Each cell can comprise a prediction probability representing a probability that the agent will be at the corresponding location in the environment at the time corresponding to the heat map. In some instances, the machine learning model can output a plurality of heat maps, wherein a heat map of the plurality of heat maps can represent probability predictions associated with the agent at a particular time in the future (e.g., 0.5 second, 1 second, 3 seconds, 5 seconds, 10 seconds, etc.). Further details related to uncertainty models and heat maps are discussed in U.S. application Ser. No. 16/151,607, which is herein incorporated by reference in its entirety for all purposes.

In addition to fusing the uncertainty data of the object into the uncertainty model, the system discussed herein, may be configured to represent the vehicle as one or more disks that allow for computationally efficient and faster consumption of the uncertainty model. For example, as disks are symmetric and rotationally invariant, collision or safety checks may be performed in planar translational space as opposed to planar translational and rotational space. By using symmetric and rotationally invariant disks, a number of calculations needed to determine collision between a vehicle and an object can be greatly simplified (e.g., by reducing calculations for determining collisions of a non-symmetric representation of the vehicle which may require calculations for multiple possible future poses of the vehicle via rotation of the vehicle).

In some cases, to further reduce the risk of collision and improve safety, the vehicle or system may represent each object as an enlarged object or having a border that is a distance from the actual border of the object (which may otherwise be referred to herein as a dilation). For instance, the system may enlarge or expand the prediction probabilities within the uncertainty model. In this manner, each object can be larger or occupy additional area than the object does in the physical environment. In some cases, the size of the region or area assigned to an object within the uncertainty model may vary based on various factors, such as velocity, speed, acceleration, class or type, and the like. For example, a vehicle moving on a highway at high speeds may be represented within the uncertainty model by a larger region than if the same vehicle was moving along a neighborhood road at low speeds.

In one specific example, the size of the region of the object may be increased by a width and/or length associated with the vehicle, such as a distance from the center of a disk representing the vehicle to the exterior of the vehicle. In this example, by increasing the size of the region represented by the objects in the uncertainty model by a width and/or length of the vehicle, the complexity of the collision analysis may be reduced. For instance, the vehicle may no longer need to determine a potential collision with respect to various points along the exterior of the vehicle and account for rotation of the vehicle over time. Rather, the vehicle may perform the collision check using the center of the one or more disks used to represent the vehicle as rotationally invariant disk(s).

In another example, heat maps or uncertainty models may be aggregated or otherwise combined to generate continuous regions or "tubes" representing two-dimensional and or three-dimensional prediction probabilities over time. In this example, the region associated with the object may be represented as one or more continuous region, each continuous region indicating a potential region occupied by an object over a period of time (such as 3 seconds, 5 seconds, 10 seconds, and the like). For instance, during a period of time, an object such as a truck may move along a current lane, switch lanes, or turn down a side street. Each one of the truck's potential behaviors may be represented by a continuous region within the model (e.g., a heatmap) over the period of time. Each potential location of the object at a given time may then be represented by an intensity (e.g., heat). For instance, each cell or pixel of the model may have a corresponding value (e.g., certainty) assigned. The higher the certainty that the truck occupies the cell at a certain time may be visually indicated by increasing the value (which may be represented as a brightness or intensity) of the region associated with the cell.

The length or size of each continuous region may also increase as the model represents further into the future. For example, assuming the truck maintains a straight trajectory within the lane, the truck may still stop, slow down, maintain a current speed, or accelerate over the period of time. Thus, the truck may occupy various regions from a current position (e.g., the position at which the prediction data was used to generate the model) if the truck stopped, to a region far in front of the truck's current position (e.g., the truck accelerated forward at an ever-increasing velocity). In this example, the region associated with the truck at say 5 seconds from the current time may include a continuous region that has varying intensity. For instance, there may be a low likelihood the truck stopped and is still occupying the same region (represented by low intensity cells in the uncertainty model). The intensity or likelihood the truck occupies positions along the lane may then increase (such as when it is likely that the truck maintains a current velocity, such as around the speed limit). The continuous region may then again decrease as the likelihood again reduces as the truck could occupy the region but is unlikely to do so as the truck would be increasingly exceeding the speed limit or would require the truck to accelerate beyond physical bounds.

In some cases, the continuous regions may be used to estimate locations by the planning system of the vehicle for periods of time between the fixed times associated with the uncertainty model. For example, the uncertainty model may be generated on a per-second basis (or per-half-second basis) while the planning system operates on a millisecond level. In this case, the planning system may utilize the continuous regions to estimate uncertainty associated with the object at a more precise level (e.g., less than a second). For example, the probabilities of the continuous regions may be fused to generate the estimated uncertainty at times between models. In this manner, the continuous region may represent the region of the vehicle over a range of time rather than at fixed time periods.

In some cases, the uncertainty model discussed herein, may be consumed to determine drivable area in which the vehicle can safely maneuver. By determining a drivable area, the vehicle and/or a planning system may make operational-based and/or route-based decision to maintain the vehicle within the drivable area while following the reference trajectory. For example, details of determining and utilizing drivable areas are discussed in U.S. Pat. No. 10,614,717 and application Ser. No. 16/179,679, which are herein incorporated by reference in their entirety for all purposes.

In some implementations, objects in an environment proximate the autonomous vehicle may be dynamic and do not have a fixed position. In these implementations, the vehicle may assume that the vehicle follows a reference trajectory at the planned velocity (or series of velocities). The vehicle may then, determine a boundary of the drivable area based on the uncertainty model (e.g., the heat map) and the planned trajectory. For example, the system may perform a level set or determine a boundary of the drivable area based on a cell within the heatmap adjacent to the planned trajectory having a likelihood or probability of occupancy meets or exceeds a threshold. As an illustrative example, for each point along the reference trajectory, identify a closest object to the vehicle (or a closest object to the front, left, right, back, etc.) based on the predicted region or position of the objects within the uncertainty model. In certain examples, for each point in time the vehicle may perform a ray trace perpendicular to the vehicle position to identify a nearest occupied region within the uncertainty model. Thus, the drivable area may be defined as if each object is stationary or fixed at each given point in time based on the predicted locations or regions occupied by the objects.

In another example, the vehicle or system may accumulate (e.g., aggregate, sum, integrate, or otherwise combine) the probability of occupancy starting at the first occupied cell perpendicular to the trajectory until the threshold is met or exceeded. In yet another example, the vehicle may determine a first cell perpendicular to the trajectory at which the probability of occupancy exceeds a meets or first threshold and a second cell also perpendicular to the trajectory at which the probability of occupancy meets or exceeds a second threshold. The vehicle or planning system may then construct an approximation of a probability of occupancy distribution (such as a Gaussian distribution of the uncertainty). The vehicle or planning system may then apply a cost function to the probability of occupancy distribution to determine an edge of region associated with the safe drivable area at the given point in time.

FIG. 1 is an example block-diagram illustrating an example architecture 100 of an associated with operational decisions of an autonomous vehicle, in accordance with embodiments of the disclosure. In the current example, an autonomous vehicle may be operating in a physical environment following a reference trajectory to a desired destination. As the vehicle travels through the physical environment, one or more sensor systems 102 of the vehicle may capture sensor data 104 representative of the environment surrounding the vehicle. In at least one example, the sensor system(s) 102 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system 102 may include multiple instances of each of these or other types of sensors. For instance, the lidar sensors may include individual lidar sensors located at the corners, front, back, sides, and/or top of the vehicle. As another example, the camera sensors may include multiple cameras disposed at various locations about the exterior and/or interior of the vehicle.

The sensor data 104 captured by the sensor systems 102 may be provided to a perception and prediction system 106. For instance, the perception system may perform classification, segmentation, and/or otherwise process the sensor data 104 to identify one or more objects (e.g., pedestrians, vehicles, animals, and the like) within the environment surrounding the vehicle. In some cases, the perception and/or prediction system 106 may perform object segmentation, feature extraction, sparse features representation, pattern detection, white space detection, pixel correlation, feature mapping, etc. and utilize one or more neural networks, deep learning, and/or regression techniques to detect, classify, and predict a motion trajectory of the object. For example, details of classification and/or segmentation are discussed in U.S. application Ser. Nos. 16/238,475 and 16/732,243, which are herein incorporated by reference in their entirety for all purposes. The output of the perception and prediction system 106 may include object and environment data 108, such as type of the objects, classification of the objects, characteristics of the objects, predicted trajectory of the objects, and the like.

The object and environment data 108 may be received by an uncertainty modeling system 110. The uncertainty modeling system 110 may consume and fuse the object and environment data 108 into an uncertainty model 112. The uncertainty model 112 may be, for instance, a map (e.g., a heatmap) representing the probability or certainty that the objects within the environment occupy a given region or location at a specific period of time. For example, the uncertainty model 112 may be represented as top-down multi-channel image of the autonomous vehicle and the surrounding environment that is output by a convolutional neural network or the like. In some cases, the uncertainty modeling system 110 may generate a series of uncertainty models 112, each of the models representing a predetermined period of time in the future, such as one second, two seconds, three seconds, etc. from the point of time at which the sensor systems 102 captured or collected the sensor data 104. In other examples, other periods of time or intervals may be used, such as half a second, two seconds, five seconds, and the like.

In some cases, the objects and/or prediction probabilities associated with the objects within the models 112 may be enlarged (e.g., dilated) such that the objects occupy a larger region than in the physical world. The larger regions may be used to reduce complexity with respect to the collision determination, discussed below, to improve operational safely of the vehicle (e.g., provide a safety buffer about the objects), and/or to more accurately represent uncertainty with respect to the behavior of the objects. In one particular example, the region potentially occupied by an object within output of an aggregate of the models 112 may be represented as a continuous region. The continuous region may be discretized and/or otherwise have various intensities associated with different portions. The intensity may represent a probability or certainty that the object may occupy a given portion of the continuous region based on a predicted behavior by the perception and/or prediction system 106. In some cases, the continuous regions may be used to predict the region occupied by an object between the period of times or intervals represented by the models 112.

The uncertainty model 112 may be received by both a drivable area determining system 114 and a collision prediction system 116. The drivable area determining system 114 may be configured to dynamically update a drivable area 118 or safe area associated with the reference trajectory of the vehicle. In some cases, the drivable area 118 may represent a safe or operational area for the vehicle around or about the reference trajectory or route (e.g., an offset along the reference trajectory). In this example, the drivable area determining system 114 may utilize the object and environment data 108 as well as the probability of occupancy represented by the uncertainty model 112 to dynamically update the drivable area 118 as the vehicle traverses along the reference trajectory.

In certain examples, the drivable area determining system 114 may assume that the vehicle follows the reference trajectory at the planned velocity or velocities. The drivable area determining system 114 may then, for each point along the reference trajectory, identify a closest object to the vehicle (or a closest object to the front, left, right, back, etc.) based on the predicted region or position of the objects within the uncertainty model 112. In certain examples, for each point in time the drivable area determining system 114 may perform a ray trace or ray cast perpendicular to the vehicle's predicted position to identify a nearest occupied region within the uncertainty model 112. Thus, the drivable area 118 may be defined as if each object is stationary or fixed at each given point in time based on the predicted locations or regions occupied by the objects. In some cases, this approach may be referred to as a level set and the probability that a pixel is occupied may be approximated using distances to the level set (or occupied pixel) as follows:

$$q(y)=f(d_0,\ldots,d_m)$$

in which an occupied pixel or cell has a value of one and an unoccupied pixel or cell has a value of zero and q(y) is the pixel at a lateral position from the vehicle of y and d denotes a distance.

In certain examples, the drivable area determining system 114 may select the nearest occupied region with greater than a threshold level of potential occupancy. In this example, the drivable area determining system 114 may again perform a ray trace perpendicular to the vehicle's predicted position to identify a nearest occupied region within the uncertainty model 112, however, the drivable area determining system 114 may only demark a boundary of the drivable area 118 when the certainty associated with an occupied cell of the model 112 meets or exceeds the threshold. In some cases, this approach may be referred to as a dynamic level set and the probability that a pixel is occupied may be approximated using a cost function, c, of the distances, d, to the boundaries of the pixels or cells as follows:

$$c=g(q(y))=g(f(d_0,\ldots,d_m))$$

in which an occupied pixel or cell has a value of less than or equal to one.

In certain examples, the drivable area determining system 114 may accumulate the uncertainty along a ray while ray tracing, starting at the first occupied cell until a threshold is met or exceeded. Again, the drivable area determining system 114 may perform the perpendicular ray tracing and demark a boundary of the drivable area 118 when the accumulated certainty or probability of occupancy associated with intersected occupied cells of the uncertainty model 112 meets or exceeds the threshold. In some cases, this approach may be referred to as a function approximation and possible techniques for accumulating the probability of occupancy may include piecewise constant, piecewise linear, spline, and the like.

In certain examples, the drivable area determining system 114 may perform the perpendicular ray tracing and identify a first cell at which the probability of occupancy exceeds a first threshold and a second cell at which the probability of occupancy exceeds a second threshold. The drivable area determining system 114 may then construct an approximation of a probability of occupancy distribution (such as a Gaussian distribution of the uncertainty) based on a location and/or distance of the first cell and the second cell. The drivable area determining system 114 may then utilize the probability of occupancy distribution to determine the safe drivable area.

The collision prediction system 116 may be configured to perform one or more safety checks associated with the operational decisions of the vehicle. In some examples, the collision prediction system 116 may be configured to determine a risk associated with the vehicle and an object occupying the same physical region based on the predicted behavior of the object, the reference trajectory, and the operational decisions of the vehicle. In some cases, the collision prediction system 116 may be configured to represent an area occupied by the autonomous vehicle a collection of simple geometric primitives. In some such examples, the representation may comprise two (or more) disks or circles with respect to the uncertainty model 112. By representing the vehicle as one or more disks the complexity of a probability of collision calculation may be reduced. For instance, as disks are symmetrical and rotationally invariant, collision or safety checks may be performed in planar translational space opposed to planar translational and rotational space.

In some cases, to further reduce the risk of collision and improve safety, the uncertainly model 112 may represent each object as an enlarged object or having a border that is a distance from the actual border of the object. In this manner, each object is larger or occupying additional area than the object is in the physical environment. In some cases, the size of the region or area assigned to an object within the uncertainty model 112 may vary based on various factors, such as velocity, speed, acceleration, class or type, and the like. In some cases, the size of the region of the object may be increased by a width and/or length associated with the vehicle, such as a distance from the center of a disk representing the vehicle to the exterior of the vehicle. In this example, by increasing the size of the region represented by the objects in the uncertainty model 112 by a width and/or length of the vehicle, the complexity of the collision analysis performed by the collision prediction system 116 may be further reduced. For instance, the collision prediction system 116 no longer needs to determine a potential collision with respect to various points along the exterior of the vehicle. Rather, the collision prediction system 116 may perform the collision check using only a single point (e.g., the center point) of each disk used to represent the vehicle.

Once the drivable area 118 is defined and the collision prediction system 116 determines the reference trajectory and operational decisions of the vehicle avoid a collision, the drive system 120 may cause the vehicle to traverse along the reference trajectory within the drivable area 118. It should be understood, the navigation system 100 continuously performs the operations discussed above with respect to the sensor systems 102, the perception and/or prediction system 106, the uncertainty modeling system 110, the drivable area determining system 114, and the collision prediction system 116 as a dynamic process.

Figure 2:
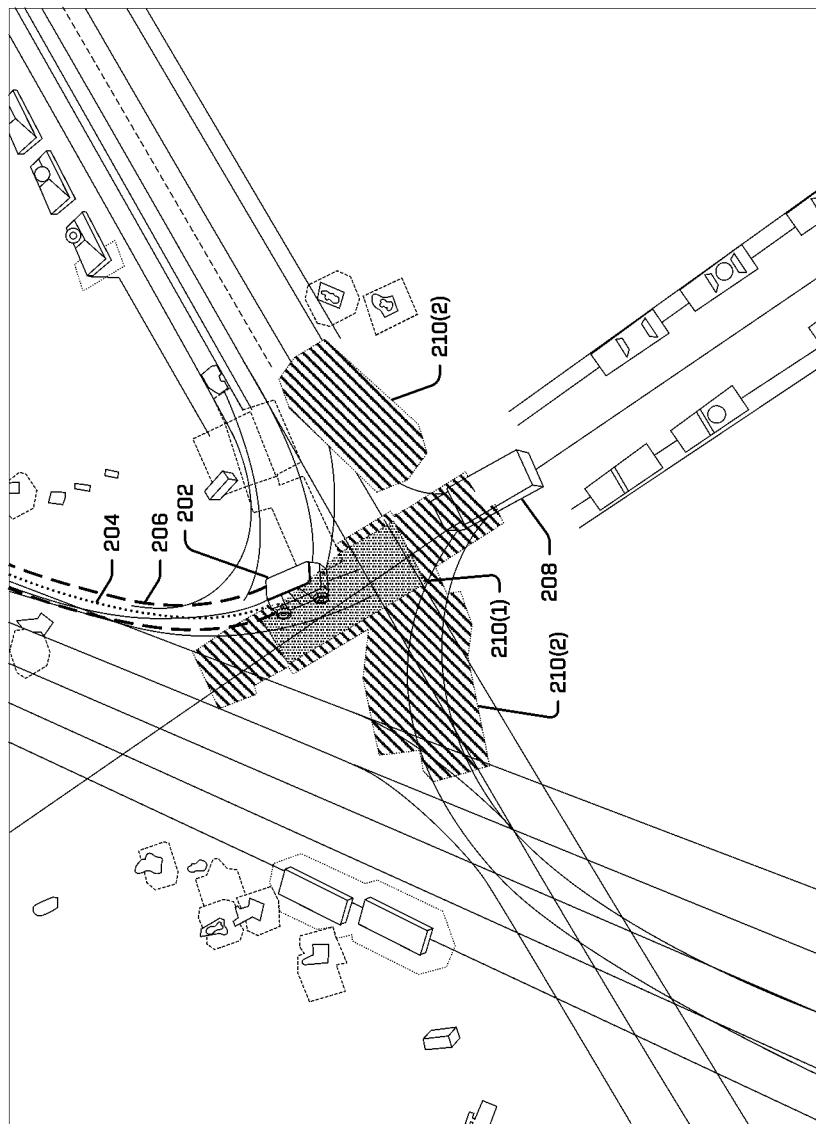
FIG. 2 is an example pictorial diagram illustrating an example portion of an uncertainty model, as described herein.

FIG. 2 is an example pictorial diagram 200 illustrating an example portion of an uncertainty model, as described herein. In the current example, an autonomous vehicle 202 is traversing a physical environment along a reference trajectory 204 and within a drivable area 206. In this example, an object (e.g., a truck) 208 has been detected behind the vehicle 202. In the current example, the uncertainty model is representing predicted regions 210 of the truck 208 at a future time (such as one second from the moment the object data was captured by the sensor system). In this example, the truck 208 has a greater likelihood to continue straight along the road rather than turning down the side roads to the right or left. Thus, in this example, the intensity of region 210(1) is brighter or denser indicating the higher certainty that the truck 208 will occupy the region 210(1) when compared with the other potential regions 210(2). Additional, description of an uncertainty model represented as a heat map are discussed in U.S. application Ser. No. 16/206,877, which is herein incorporated by reference, in its entirety.

Figure 3:
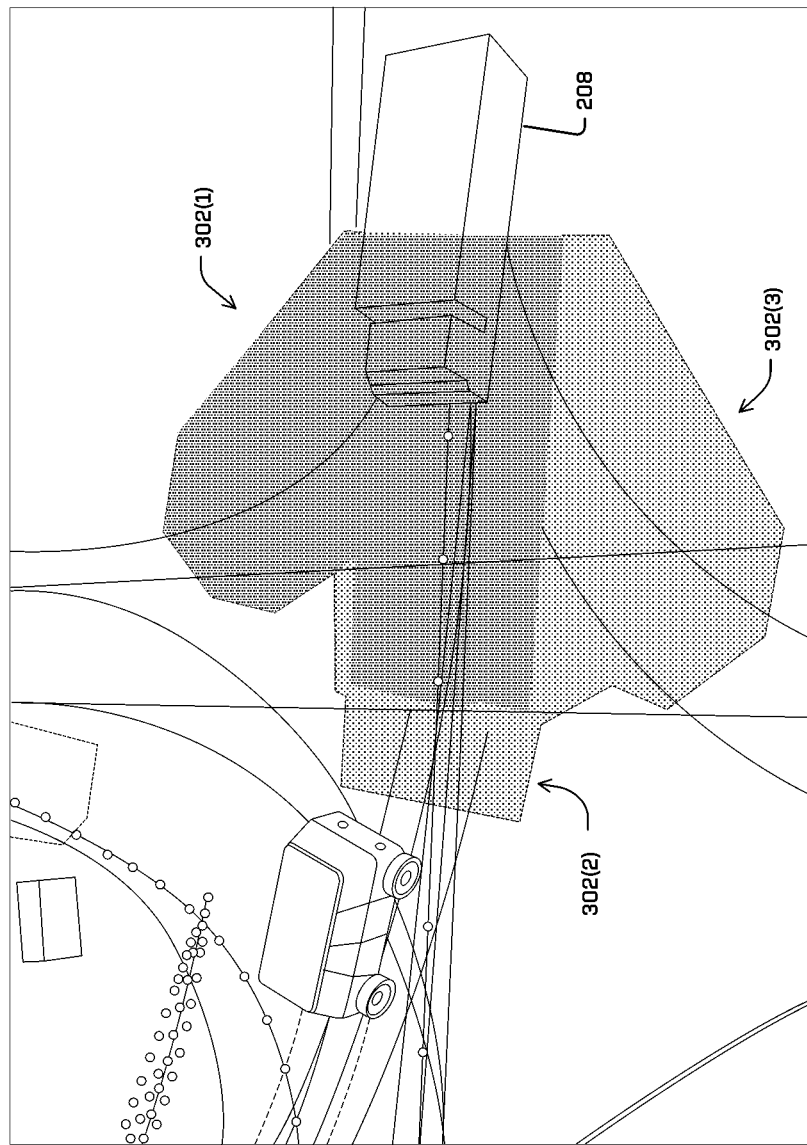
FIG. 3 is an example pictorial diagram illustrating an example portion of an uncertainty model, as described herein.

FIG. 3 is an example pictorial diagram 300 illustrating an example portion of an uncertainty model, as described herein. In this example, the predicted regions of occupancy by the truck 208 may be shown as continuous regions or continuous regions 302. In this example, the continuous regions 302 may have greater intensity or density to represent a higher predicted certainty that the truck 208 will occupy the associated region or cells within the continuous region 302. The illustrated example shows three continuous regions 302(1)-(3). Each of the three continuous regions 302(1)-(3) represent possible trajectories that the truck 208 may take. In this example, the continuous regions 302(1) and 302(2) have a higher likelihood of the truck 208 traversing the corresponding trajectory and, thus, are more intense or bright than the continuous region 302(3).

Figure 4:
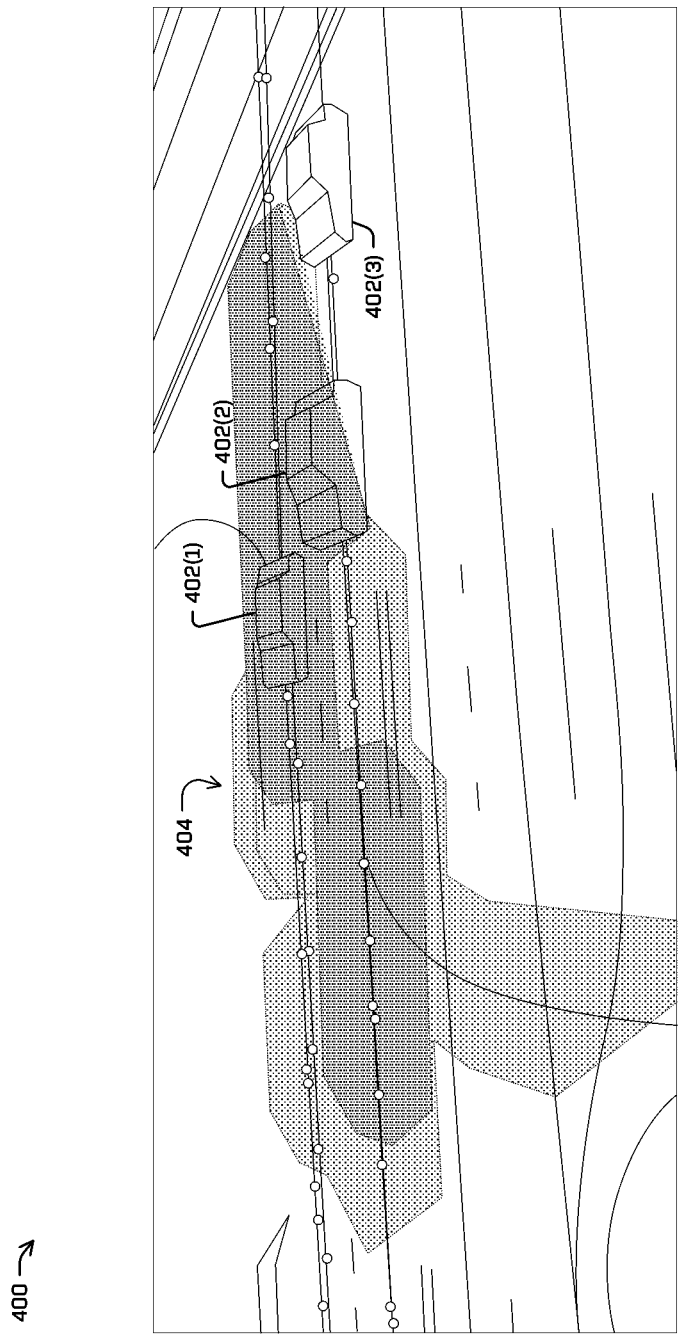
FIG. 4 is an example pictorial diagram illustrating an example portion of an uncertainty model, as described herein.

FIG. 4 is an example pictorial diagram 400 illustrating an example portion of an uncertainty model, as described herein. In the current example, the uncertainty model may be representing the potential regions of occupancy of multiple vehicles 402(1)-(3). In this example, the vehicles 402(1) is predicted to continue along the current trajectory but may slow down or changes lanes. Similarly, the vehicle 402(2) is predicted to continue or turn down the side road and the vehicle 402(3) is predicted to change lanes and occupy a region behind the vehicle 402(1). In this example, the continuous regions or regions of occupancy, generally indicated by 404, may represent at each cell a likelihood that the cell is occupied but not necessarily by which vehicle 402 (1)-(3). In various implementations, the uncertainty model may represent the certainty of occupancy of a cell by selecting the highest probability. For instance, if vehicle 402(2) has a higher probability of occupying a first cell of the region 404 than the vehicle 402(1), the model may select the probability or certainty associated with the vehicle 402(2) to represent the first cell. In other implementations, the uncertainty model may sum or accumulate the probabilities or certainties of the vehicle 402(1) and 402(2) with respect to the first cell. It should be understood that the uncertainty model may also represent the value of each cell using other techniques, such as applying a weighted average to the probabilities or certainties of the vehicle 402(1) and 402(2) with respect to the first cell and then accumulating.

Figure 5:
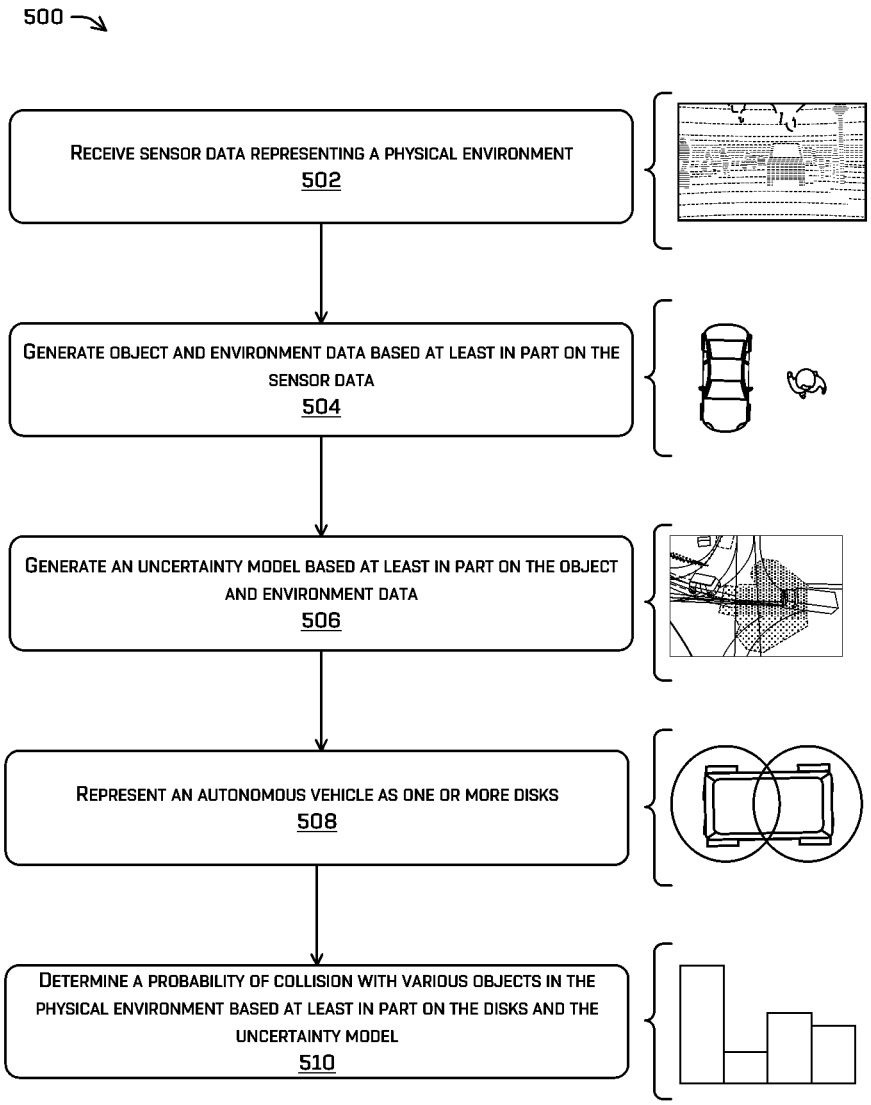
FIG. 5 is a flow diagram illustrating an example process for detecting potential collisions, as described herein.
Figure 6:
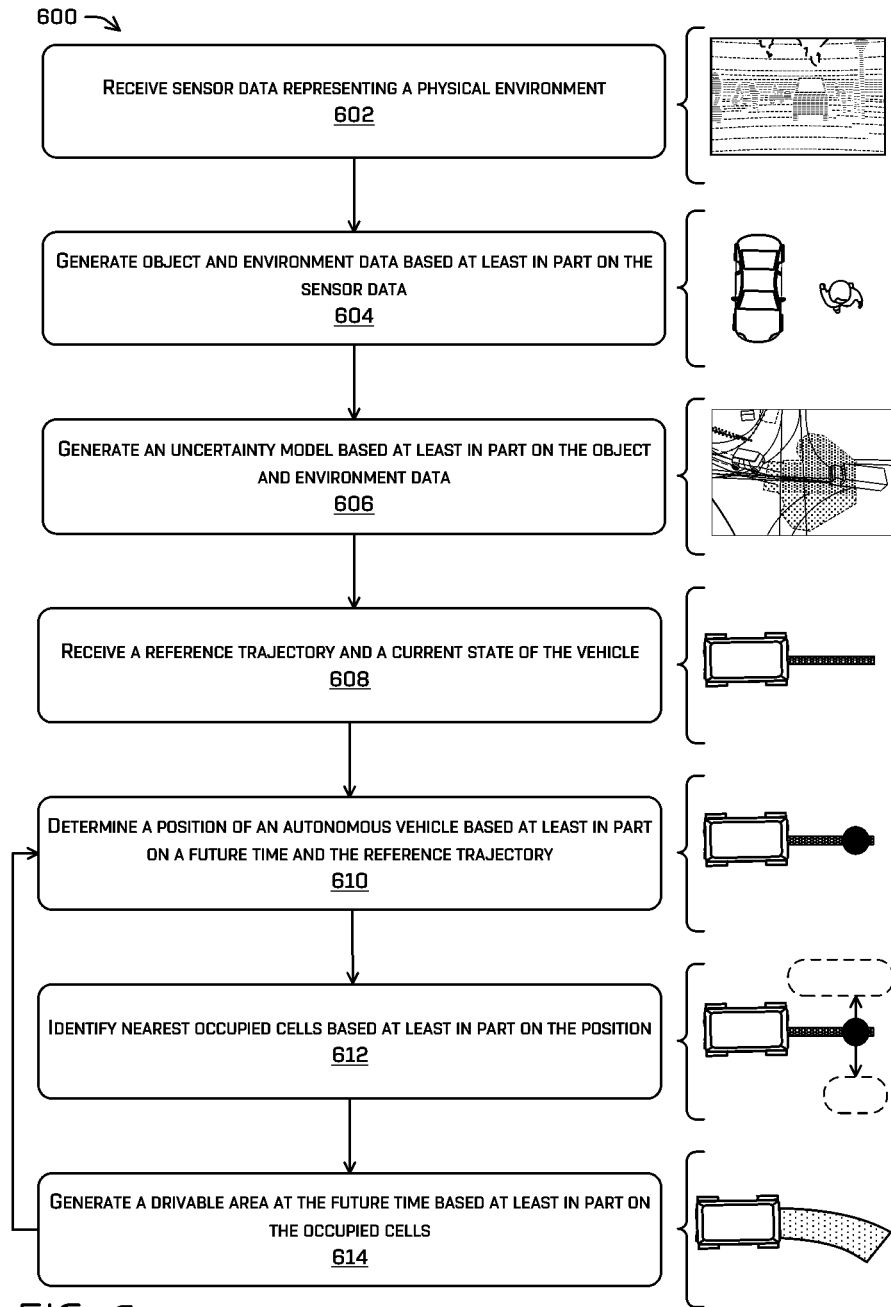
FIG. 6 is a flow diagram illustrating an example process for generating a drivable area, as described herein.

FIGS. 5 and 6 are flow diagrams illustrating example processes associated with the uncertainty models discussed herein and according to some implementations. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 5 is a flow diagram illustrating an example process 500 for detecting potential collisions, as described herein. As discussed above, an autonomous vehicle or vehicle navigation system may be configured to perform collision checks using a cohesive uncertainty model representative of the physical environment, for instance in the manner of a heatmap opposed to as a list of disparate objects, thereby reducing the overall number of calculations required to detect the potential collisions. As a result, the overall safety of the autonomous vehicle may be approved as potential collisions may be more efficiently detected.

At 502, the autonomous vehicle may receive sensor data representing a physical environment. For example, the sensor data may be received from one or more sensors and/or one or more types of sensors positioned about the vehicle. For instance, in at least one implementation, the sensors may include lidar sensors, radar sensors, ultrasonic transducers, sonar sensors, location sensors, inertial sensors, accelerometers, magnetometers, gyroscopes, cameras, microphones, wheel encoders, environment sensors, and the like. In some cases, the vehicle may include multiple instances of each of these or other types of sensors. For instance, the lidar sensors may include individual lidar sensors located at the corners, front, back, sides, and/or top of the vehicle. As another example, the camera sensors may include multiple cameras disposed at various locations about the exterior and/or interior of the vehicle.

At 504, the autonomous vehicle may generate object and environment data based at least in part on the sensor data. for instance, the vehicle may perform classification operations, object segmentation, feature extraction, sparse features representation, pattern detection, white space detection, feature mapping, and the like on the sensor data. In some cases, the vehicle may utilize one or more neural networks, deep learning, and/or regression techniques to detect, classify, and track objects and events represented by the sensor data. For example, details of object detection and tracking are discussed in U.S. application Ser. Nos. 16/779,576 and 16/235,862, which are herein incorporated by reference, in their entirety.

At 506, the autonomous vehicle may generate an uncertainty model based at least in part on the object and environment data. For instance, the object and environment data may include predictions and probabilities associated with the behavior of each of the identified objects. The autonomous vehicle may fuse the data into a heatmap or other type of model representing a likelihood that each cell or pixel of the map is occupied by an object. For example, the autonomous vehicle may fuse probabilities generated from sensor data collected at various intervals. The vehicle may also interpolate probabilities of occupancy of a pixel or cell of the model at points in time between the intervals selected. In some cases, the uncertainty model may include a plurality or multiple models. In these cases, each uncertainty model may represent the physical environment at a predetermined period of time. For example, the uncertainty models may each represent the environment at a periodic interval (such as every second). In these cases, each successive uncertainty model may represent the physical environment one time period following the time period associated with the preceding model.

In some cases, to further reduce the risk of collision and improve safety, the uncertainly model may represent each object as an enlarged or dilated object or having a border that is a distance from the actual border of the object. For example, the size of the object may be enlarged by a length of a radius of the circle used to represent the autonomous vehicle (e.g., or half a length of other geometric primitives selected to represent the vehicle). In this manner, each object is larger or occupying additional cells than the object would otherwise in a physical environment. In some cases, the size of the region or area assigned to an object within the uncertainty model may vary based on various factors, such as velocity, speed, acceleration, class or type, and the like.

In one implementation, the cells of the uncertainty model associated with an object may be represented as continuous regions. In this example, the region associated with the object may be represented as one or more continuous region, each continuous region indicating a potential region occupied by an object over a period of time (such as 3 seconds, 5 seconds, 10 seconds, and the like). Each potential region occupied by the object at a given time may then be represented by an intensity (e.g., heat) within the continuous region. The higher the certainty that the truck occupies the cell may be visually indicated by increasing the brightness of the region associated with the cell.

At 508, the autonomous vehicle may represent itself as a set of simple geometrics primitives such as one or more disks. For example, the autonomous vehicle may be represented as one or more disks (such as the illustrated two disks) that allow for computationally efficient and faster computations with respect to the uncertainty model. For example, as disks are symmetrical and rationally invariant, collision or safety checks may be performed in planar translational space opposed to planar translational and rotational space. In some examples, the vehicle may be represented as two disks, with a first disk representing the front of the vehicle and a second disk representing the rear of the vehicle. In some examples, the vehicle may be represented with more disks of different radii. A disk used to represent the vehicle may be aligned with the center of the vehicle (as illustrated) or may be offset to a side of the centerline. In at least some examples, the disks may comprise a first disk having a width of half of the autonomous vehicle in the back and a width of half the autonomous vehicle in the front. In further examples, such geometric primitives may also comprise two additional (and, in some examples, smaller) disks on a left and right side of the autonomous vehicle. In at least some examples, the disks may comprise a first disk having a width of half of the autonomous vehicle in the back and a width of half the autonomous vehicle in the front. In further examples, such geometric primitives may also comprise two additional (and, in some examples, smaller) disks on a left and right side of the autonomous vehicle.

Certain aspects of the disclosed techniques include determining a safe driving area of an autonomous vehicle including determining a probability of occupancy of an area perpendicular to a planned route of the autonomous vehicle. Selecting a disk to model the vehicle having a radius equal to half a width of the vehicle can be useful for such techniques especially if, for example, the probability distribution associated with an object perpendicular to the vehicle is enhanced/enlarge equal to the radius of the disk. Using such techniques, a center point of the disk can be used to detect collisions and/or to plan for a safe driving area for the vehicle.

In this example, the size of the region within the uncertainty model associate with one or more objects may be increased by a width and/or length associated with the vehicle, such as a distance from the center of the disks representing the vehicle to the exterior of the vehicle. In this manner, collisions may be predicted using the center of the disks in relation to the uncertainty model and fewer calculations may be performed when compared with conventional systems. In some implementations, the use of the uncertainty models may allow for reduced computational complexity and improve processing times. For example, the use of the uncertainty model may allow for importance sampling and single computations across multiple dynamic objects within the model. As the model represents at each pixel or cell the highest probability of occupancy any potential collision determination may be reduced to the likelihood of collision with the object providing the probability of occupancy to the particular cells or pixels at interest.

At 510, the autonomous vehicle may determine a probability of collision with various objects in the physical environment based at least in part on the disks and the uncertainty model. For example, the probability of collision between the autonomous vehicle and an object may be determined using the uncertainty model and the radius of the disk. In various implementations, the probability of collision may be determined based on an assumption that the objects have a strong dependence or act in response to each other. For example, the probability of occupancy of a particular cell of the uncertainty model may utilized independently (e.g., two objects will not occupy the same cell). As such, in this example, the autonomous vehicle may select the highest probability of occupancy as the probability associated with the particular cell.

In other implementations, the probability of collision may be determined based on an assumption that the object acts independently but the collision is not mutually exclusive. In this example, the autonomous vehicle may select the highest probability of occupancy as the most likely object to occupy the particular cell but increase or otherwise modify the probability of occupancy of the cell based on a second object's probability of occupancy of the particular cell and/or nearby (e.g., within a threshold distance of the particular cell) or adjacent cells.

In still other implementations, the probability of collision may be determined based on an assumption that the objects and collision as are mutually exclusive events. In this example, the autonomous vehicle may accumulate the probability of occupancy of the particular cell prior to preforming the probability of collision calculations.

FIG. 6 is a flow diagram illustrating an example process 600 for generating an drivable area, as described herein. As discussed above, the vehicle may consume the uncertainty model to assist with determining a drivable area or safe area for the vehicle to traverse. In the various examples, the drivable area may be updated dynamically as sensor data is collected by the various sensor systems and the uncertainty model is revised.

At 602, the autonomous vehicle may receive sensor data representing a physical environment. For example, the sensor data may be received from one or more sensors and/or one or more types of sensors positioned about the vehicle. For instance, in at least one implementation, the sensors may include lidar sensors, radar sensors, ultrasonic transducers, sonar sensors, location sensors, inertial sensors, accelerometers, magnetometers, gyroscopes, cameras, microphones, wheel encoders, environment sensors, and the like. In some cases, the vehicle may include multiple instances of each of these or other types of sensors. For instance, the lidar sensors may include individual lidar sensors located at the corners, front, back, sides, and/or top of the vehicle. As another example, the camera sensors may include multiple cameras disposed at various locations about the exterior and/or interior of the vehicle.

At 604, the autonomous vehicle may generate object and environment data based at least in part on the sensor data. For instance, the vehicle may perform classification operations, object segmentation, feature extraction, sparse features representation, pattern detection, white space detection, feature mapping, and the like on the sensor data. In some cases, the vehicle may utilize one or more neural networks, deep learning, and/or regression techniques to detect, classify, and track objects and events represented by the sensor data.

At 606, the autonomous vehicle may generate an uncertainty model based at least in part on the object and environment data. For instance, the object and environment data may include predictions and probabilities associated with the behavior of each of the identified objects. The autonomous vehicle may fuse the data into a heatmap or other type of model representing a likelihood that each cell or pixel of the map is occupied by an object. In some cases, the uncertainty model may include a plurality or multiple models. In these cases, each uncertainty model may represent the physical environment at a predetermined period of time. For example, the uncertainty models may each represent the environment at a periodic interval (such as every second). In these cases, each successive uncertainty model may represent the physical environment one time period following the time period associated with the preceding model.

At 608, the autonomous vehicle may receive a reference trajectory and a current state of the vehicle from, for instance, a planning system. The reference trajectory may be a route from a current location to a destination. The reference trajectory may be used to generate a planned path of the vehicle based on changing traffic conditions (e.g., accidents and the like) as the vehicle is in route.

At 610, the autonomous vehicle may determine a position of the autonomous vehicle based at least in part on a future time and the reference trajectory. For example, the vehicle may project the vehicle along the reference trajectory at various intervals (such as half a second, one second, one and half seconds, and the like) into the future. In some cases, the predicted position may be based on predicted operating decisions and/or current characteristics of the vehicle, such as velocity, potential course changes (e.g., turns, lane changes, etc.), traffic conditions (e.g., amount of traffic, presence of stop signs or lights, estimated velocity of the traffic, etc.), and the like.

At 612, the autonomous vehicle may identify nearest occupied cells based at least in part on the position. For instance, the autonomous vehicle may perform a ray trace perpendicular to the vehicle position (e.g., to the right and left of the vehicle) to identify a nearest occupied cell or region within the uncertainty model. Thus, the drivable area may be defined as if each object is stationary or fixed at each given point in time based on the predicted locations or cells occupied by the objects. In this example, the boundary of the drivable area may be set upon the ray intersecting an occupied cell within the uncertainty model.

In another instance, the vehicle may select the nearest occupied cell with greater than a threshold level of certainty (e.g., the likelihood the cell is occupied at the future time is greater than a threshold). In this example, the boundary of the drivable area may be set upon the ray intersects an occupied cell having an assigned probability of occupancy value greater than the threshold. In an alternative instance, the vehicle may accumulate the probability of occupancy starting at the first occupied cell intersected by the ray until a threshold is met or exceeded. For example, the vehicle may accumulate the probability of occupancy value assigned to a first intersected cell, a second intersected cell, a third intersected cell, etc., until the total value (e.g., the summed value) is greater than the threshold. In some cases, the vehicle may apply a weighted value to each of the intersected cells prior to summing the values and comparing with the threshold.

In yet another instance, the vehicle may determine a first cell at which the probability of occupancy exceeds a first threshold and a second cell at which the probability of occupancy exceeds a second threshold. The vehicle may then construct an approximation of a probability of occupancy distribution (such as a Gaussian distribution of the certainty). The vehicle or planning system may then determine a boundary of the drivable area at the future time based at least in part on the probability of occupancy distribution.

At 614, the autonomous vehicle may generate a drivable area at the future time based at least in part on the occupied cells. For example, the vehicle may set the boundary for the drivable area at the future time based on the occupied cells, as discussed above. The vehicle may then select the next time interval (e.g., the next future period of time) and repeat steps 610-614. It should be understood that in some implementations, the steps 610-614 may be performed for multiple period or intervals of time substantially concurrently such that the drivable area may be updated at multiple positions in substantial unison.

Additionally, it should be understood that the process 600 is discussed with respect to a single instance of sensor data and that in operation the sensor data is continuously collected and that the uncertainty model may be generated and updated either continuously or as part of a regular interval based on the sensor data. In this manner, the process 600 may be performed at regular intervals, such as every quarter second, every half second, every second, and the like and, thus, the drivable area is updated in substantially real time as the vehicle traverses the reference trajectory.

Figure 7:
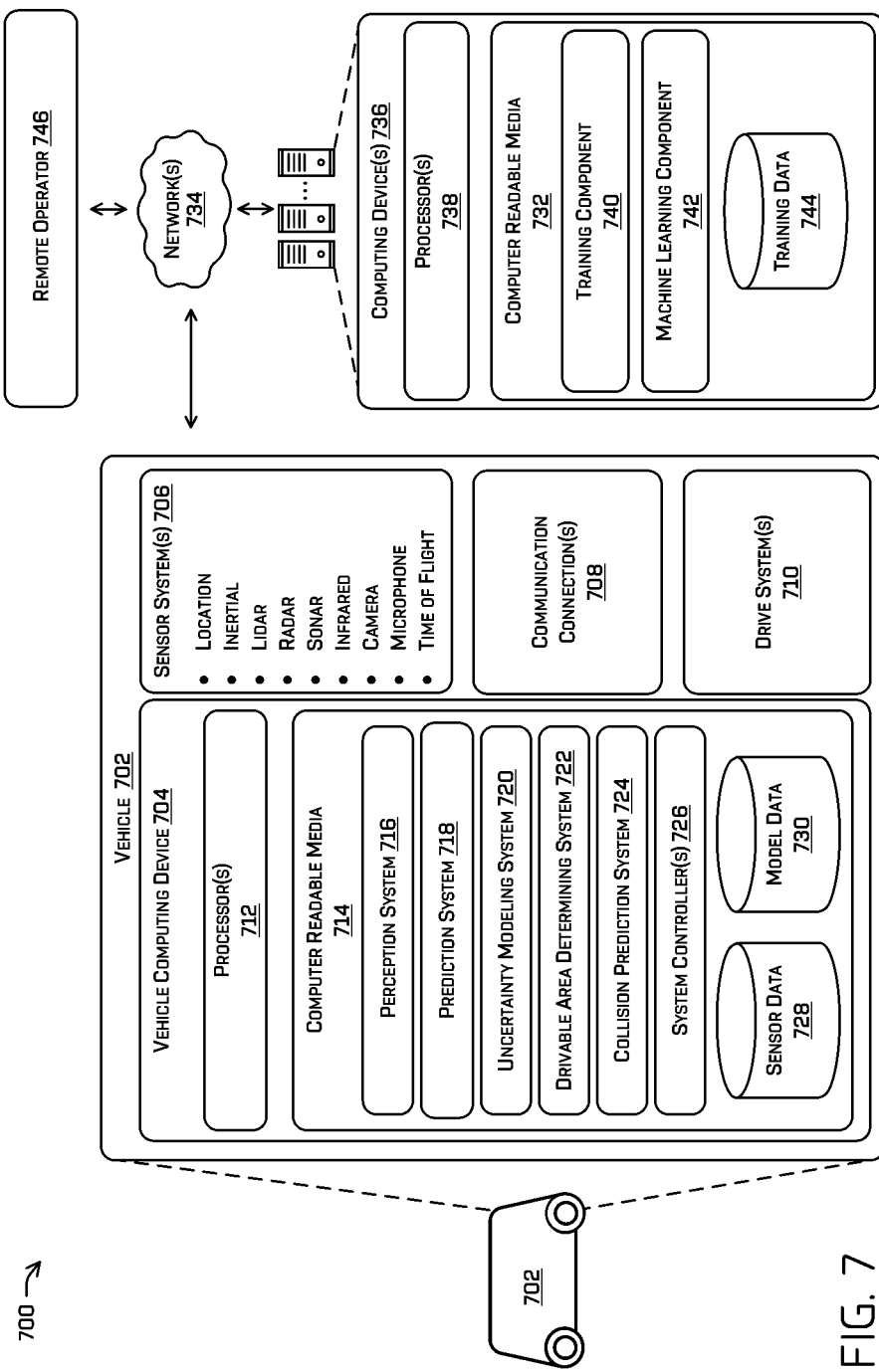
FIG. 7 is a block diagram of an example system for implementing the techniques described herein, in accordance with embodiments of the disclosure.

FIG. 7 is a block diagram of an example system 700 for implementing the techniques described herein, in accordance with embodiments of the disclosure. In some examples, the system 700 may include one or multiple features, components, and/or functionality of embodiments described herein with reference to FIGS. 1-6. In some embodiments, the system 700 may include a vehicle 702. The vehicle 702 may include a vehicle computing device 704, one or more sensor systems 706, one or more communication connections 708, and one or more drive systems 710.

The vehicle computing device 704 may include one or more processors 712 and computer readable media 714 communicatively coupled with the one or more processors 712. In the illustrated example, the vehicle 702 is an autonomous vehicle; however, the vehicle 702 could be any other type of vehicle, or any other system (e.g., a robotic system, a camera enabled smartphone, etc.). In the illustrated example, the computer readable media 714 of the vehicle computing device 704 stores a perception system 716, a prediction system 718, an uncertainty modeling system 720, a drivable area determining system 722, a collision prediction system 724, one or more system controllers 726 as well as sensor data 728 and model data 730 (e.g., the uncertainty models). Though depicted in FIG. 7 as residing in computer readable media 714 for illustrative purposes, it is contemplated that the perception system 716, the prediction system 718, the uncertainty modeling system 720, the drivable area determining system 722, the collision prediction system 724, the one or more system controllers 726 as well as the sensor data 728, model data 730, and the other data, may additionally, or alternatively, be accessible to the vehicle 702 (e.g., stored on, or otherwise accessible by, computer readable media remote from the vehicle 702).

In at least one example, the perception system 716 may be configured to receive sensor data 728 captured during normal operations of the vehicle by the sensor system 706. The perception system 716 may implement object detection, object classification, and object tracking update pipelines.

The prediction system 718 may be configured to estimate current, and/or predict future, characteristics or states of objects, such as pose, speed, trajectory, momentum, yaw, yaw rate, roll, roll rate, pitch, pitch rate, position, acceleration, or other characteristics, based at least in part on the output of the perception system 716. For instance, the prediction system 718 may determine if an object entering the distance threshold has the potential to cause a low momentum impact with the vehicle 702. For example, the prediction system 718 may also output the uncertainty model. As discussed above, the uncertainty model may include functionality to generate a discretized probability distribution, a probability map, a discretized prediction probability map, or a heat map representing prediction probabilities of possible locations for individual objects in an environment. For example, prediction system 718 can generate an uncertainty model in the form of a top-down view of the environment including objects in the environment (e.g., represented by a bounding box, as discussed herein), semantic information about the object (e.g., a classification type), movement information (e.g., velocity information, acceleration information, etc.), and the like. The prediction system 718 may further generate image elements (e.g., symbols) in the image representing the various attributes of the object(s) and the environment, including but not limited to: one or more velocity vectors, one or more acceleration vectors, lighting indicators (e.g., braking lights of the object, turn signal lights of the object, etc., represented as respective indicator status), traffic light information (e.g., status of a traffic light), lane information (e.g., whether the lane is a left turn only lane, right turn only lane, etc.), and the like. Further details related to uncertainty models and heat maps are discussed in U.S. application Ser. No. 16/206, 877, which is herein incorporated by reference in its entirety.

The uncertainty modeling system 720 may be configured to generate an uncertainty model 730 of the occupancy of various regions about the vehicle 702. For example, the uncertainty modeling system 720 may consume and fuse the object and environment data output by the perception system 716 and/or the prediction system 718 into an uncertainty model 730. The uncertainty model 730 may be, for instance, a map (e.g., a heatmap) representing the probability or certainty that the objects within the environment occupy a given region or location at a specific period of time. For example, the uncertainty modeling system 730 may generate a series of uncertainty models 730, each of the models representing a predetermined period of time in the future, such as one second, two seconds, three seconds, etc. from the point of time at which the sensor systems 706 captured or collected the sensor data 728. In other examples, other periods of time or intervals may be used, such as half a second, two seconds, five seconds, and the like.

In some cases, the objects within the models 730 may be enlarged or dilated such that the objects occupy a larger region than in the physical world. The larger regions may be used to reduce complexity with respect to the collision determination, discussed below, improve the overall safety of the vehicle by providing a buffer area about the dynamic object, and/or to more accurately represent uncertainty with respect to the behavior of the objects. In one particular example, the region potentially occupied by an object within the model 730 may be represented as a continuous region. The continuous region may have various intensities associated with different portions. The intensity may represent the probability or certainty that the object may occupy the given portion of the continuous region based on a predicted behavior by the perception system 716 and/or the prediction system 718. In some cases, the continuous regions may be used to predict the region occupied by an object between the period of times or intervals represented by the models 730.

The uncertainty model 730 may be received by both the drivable area determining system 722 and the collision prediction system 724. The drivable area determining system 722 may be configured to dynamically update a drivable area or safe area associated with the reference trajectory of the vehicle. In some cases, the drivable area may represent a safe or operational area for the vehicle around or about the reference trajectory or route (e.g., an offset along the reference trajectory). In this example, the drivable area determining system 722 may utilize the object and environment data as well as the probability of occupancy represented by the uncertainty model 730 to dynamically update the drivable area as the vehicle traverses along the reference trajectory.

In certain examples, the drivable area determining system 722 may assume that the vehicle follows the reference trajectory or reference trajectory at the planned velocity. The drivable area determining system 722 may then for each point along the reference trajectory identify a closest object to the vehicle based on the predicted region or position of the objects within the uncertainty model 730 as discussed above with respect to FIG. 6.

In other examples, the drivable area determining system 722 may perform the perpendicular ray tracing and identify a first cell at which the probability of occupancy exceeds a first threshold and a second cell at which the probability of occupancy exceeds a second threshold. The drivable area determining system 722 may then construct an approximation of a probability of occupancy distribution (such as a Gaussian distribution of the uncertainty) based on a location and/or distance of the first cell and the second cell. The drivable area determining system 722 may then apply a cost function to the probability of occupancy distribution to determine the boundary of drivable area at a given point in time.

The collision prediction system 724 may be configured to perform one or more safety check associated with the operational decisions of the vehicle. In some examples, the collision prediction system 724 may be configured to determine a risk associated with the vehicle and an object occupying the same physical region based on the predicted behavior of the object, the reference trajectory, and the operational decisions of the vehicle. In some cases, the collision prediction system 724 may be configured to represent the autonomous vehicle as two overlapping disks or circles with respect to the uncertainty model 730. By representing the vehicle as one or more disks, the complexity of a probability of collision calculation may be reduced. For instance, as disks are symmetric and rationally invariant, collision or safety checks may be performed in planar translational space opposed to planar translational and rotational space.

In some cases, to further reduce the risk of collision and improve safety, the uncertainly model 730 may represent each object as an enlarged object or having a border that is a distance from the actual border of the object. In this manner, each object is larger or occupying an additional area than the object is in the physical environment. In some cases, the size of the region or area assigned to an object within the uncertainty model 730 may vary based on various factors, such as velocity, speed, acceleration, class or type, and the like. In some cases, the size of the region of the object may be increased by a width and/or length associated with the vehicle, such as a distance from the center of a disk representing the vehicle to the exterior of the vehicle. In this example, by increasing the size of the region represented by the objects in the uncertainty model 730 by a width and/or length of the vehicle, the complexity of the collision analysis performed by the collision prediction system 724 may be further reduced. For instance, the collision prediction system 724 no longer needs to determine a potential collision with respect to various points along the exterior of the vehicle. Rather, the collision prediction system 116 may perform the collision check using only the center point of each disk used to represent the vehicle.

In at least one example, the vehicle computing device 704 can include one or more system controllers 726, which can be configured to control steering, propulsion, braking, safety, emitters, communication, and other systems of the vehicle 702. These system controller(s) 726 may communicate with and/or control corresponding systems of the drive system(s) 710 and/or other components of the vehicle 702.

In some instances, aspects of some or all of the components discussed herein can include any models, algorithms, and/or machine learning algorithms. For example, in some instances, components in the computer readable media 714 (and the computer readable media 732, discussed below) such as the perception system 716, the prediction system 718, the uncertainty modeling system 720, the drivable area determining system 722, the collision prediction system 724 may be implemented as a neural network. For instance, a machine learned model (e.g., neural network) which has been trained to predict speed, trajectory, and/or other characteristics of a pedestrian (or other object) based on image data.

In at least one example, the sensor system(s) 706 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), and one or more time of flight (ToF) sensors, etc. The sensor system(s) 706 can include multiple instances of each of these or other types of sensors. For instance, the lidar sensors may include individual lidar sensors located at the corners, front, back, sides, and/or top of the vehicle 702. As another example, the camera sensors can include multiple cameras disposed at various locations about the exterior and/or interior of the vehicle 702. The sensor system(s) 706 may provide input to the vehicle computing device 704. Additionally, or alternatively, the sensor system(s) 706 can send sensor data, via the one or more networks 734, to the one or more computing device(s) at a particular frequency, after a lapse of a predetermined period of time, in near real-time, etc.

The vehicle 702 can also include one or more communication connection(s) 708 that enable communication between the vehicle 702 and one or more other local or remote computing device(s). For instance, the communication connection(s) 708 may facilitate communication with other local computing device(s) on the vehicle 702 and/or the drive system(s) 710. Also, the communication connection(s) 708 may allow the vehicle 702 to communicate with other nearby computing device(s) (e.g., other nearby vehicles, traffic signals, etc.). The communications connection(s) 708 also enable the vehicle 702 to communicate with remote teleoperations computing device or other remote services.

The communications connection(s) 708 may include physical and/or logical interfaces for connecting the vehicle computing device 704 to another computing device (e.g., computing device(s) 736) and/or a network, such as network(s) 734. For example, the communications connection(s) 708 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 can include one or more drive systems 710. In some examples, the vehicle 702 may have a single drive system 710. In at least one example, if the vehicle 702 has multiple drive systems 710, individual drive systems 710 can be positioned on opposite ends of the vehicle 702 (e.g., the front and the rear, etc.). In at least one example, the drive system(s) 710 can include one or more sensor systems 706 to detect conditions of the drive system(s) 710 and/or the surroundings of the vehicle 702, as discussed above. By way of example and not limitation, the sensor system(s) 706 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 710. In some cases, the sensor system(s) 706 on the drive system(s) 710 can overlap or supplement corresponding systems of the vehicle 702.

In at least one example, the components discussed herein can process sensor data 728, as described above, and may send their respective outputs, over the one or more network(s) 734, to one or more computing device(s) 736. In at least one example, the components discussed herein may send their respective outputs to the one or more computing device(s) 736 at a particular frequency, after a lapse of a predetermined period of time, in near real-time, etc.

In some examples, the vehicle 702 can send sensor data to one or more computing device(s) 736 via the network(s) 734. In some examples, the vehicle 702 can send raw sensor data 728 to the computing device(s) 736 and/or the uncertainty model data 730. In other examples, the vehicle 702 can send processed sensor data 728, representations of sensor data (for instance, the object perception tracks), and/or the uncertainty model data 730 to the computing device(s) 736. In some examples, the vehicle 702 can send sensor data 728 to the computing device(s) 736 at a particular frequency, after a lapse of a predetermined period of time, in near real-time, etc. In some cases, the vehicle 702 can send sensor data (raw or processed) to the computing device(s) 736 as one or more log files.

The computing device(s) 736 may include processor(s) 738 and computer readable media 732 storing a training component 740, a machine learning component 742, as well as training data 744 and/or ground truth data that may be used to train the models. The training component 740 may generate the training data 744 using the sensor data 728 and/or the model data 730 received from one or more vehicles 702. For instance, the training component 740 may label data representative of events with one or more measured parameters or characteristics. The training component 740 may then use the training data 744 to train the machine learning component 742 to generate models for the uncertainty modeling system 720, the drivable area determining system 722, and/or the collision prediction system 724 to predict low momentum impacts, as discussed above.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The processor(s) 712 of the vehicle 702 and the processor(s) 738 of the computing device(s) 736 may be any suitable processor capable of executing instructions to process data and perform operations as described herein. By way of example and not limitation, the processor(s) 712 and 736 can comprise one or more Central Processing Units (CPUs), Graphics Processing Units (GPUs), or any other device or portion of a device that processes electronic data to transform that electronic data into other electronic data that can be stored in registers and/or computer readable media. In some examples, integrated circuits (e.g., ASICs, etc.), gate arrays (e.g., FPGAs, etc.), and other hardware devices can also be considered processors in so far as they are configured to implement encoded instructions.

Computer readable media 714 and 732 are examples of non-transitory computer-readable media. The computer readable media 714 and 734 can store an operating system and one or more software applications, instructions, programs, and/or data to implement the methods described herein and the functions attributed to the various systems. In various implementations, the computer readable media can be implemented using any suitable computer readable media technology, such as static random-access memory (SRAM), synchronous dynamic RAM (SDRAM), nonvolatile/Flash-type memory, or any other type of computer readable media capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component.

It should be noted that while FIG. 7 is illustrated as a distributed system, in alternative examples, components of the vehicle 702 can be associated with the computing device(s) 736 and/or components of the computing device(s) 736 can be associated with the vehicle 702. That is, the vehicle 702 can perform one or more of the functions associated with the computing device(s) 736, and vice versa. Further, aspects of machine learning component 742 can be performed on any of the devices discussed herein.

In some examples, the vehicle 702 may also be communicatively coupled via the network 734 to one or more remote operators 746. The remote operators 746 may be configure to or able to assume operational control of the vehicle 702. For instance, the remote operators 746 may be able to steer or drive the vehicle 702 via a remote interface. In some cases, the vehicle 702 may alert or otherwise notify the remote operator 746 in response to detecting an impact event or a potential impact event.

EXAMPLE CLAUSES

A. An autonomous vehicle system comprising: a sensor; one or more processors; and one or more non-transitory computer readable media storing instructions executable by the one or more processors, wherein the instructions, when executed, cause the autonomous vehicle to perform operations comprising: receiving sensor data representative of a physical environment from the sensor; generating, based at least in part on the sensor data, a dilated prediction probability associated with a location of an object and an additional area exceeding the location of the object; comparing a point representing the autonomous vehicle with the dilated prediction probability; and causing, based at least in part on the comparing the point representing the vehicle with the dilated prediction probability, the autonomous vehicle to perform an action.

B. The autonomous vehicle system of claim A, the operations further comprising: determining, based on an overlap between the point and at least a portion of the dilated prediction probability, a likelihood of collision between the autonomous vehicle and the object; and causing the autonomous vehicle to perform the action further based at least in part on the likelihood of collision.

C. The autonomous vehicle system of claim A, wherein the additional area exceeding the location of the object is based at least in part on a dimension of a representation of the autonomous vehicle.

D. The autonomous vehicle system of claim B, wherein the representation of the autonomous vehicle is a disk and the dimension of the autonomous vehicle corresponds to a radius of the disk.

E. The autonomous vehicle system of claim A, the dilated prediction probability is one of several dilated prediction probabilities associated with a first future location of the object at a first time and a second future location of the object at a second time, wherein the first time is different from the second time; the instructions, when executed, cause the autonomous vehicle to perform further operations comprising generating, based on the first future location and the second future location, a continuous region, the continuous region representing a potential future area of occupancy of the object; and causing the autonomous vehicle to perform the action is based on the continuous region.

F. A method comprising: generating a probability distribution representing prediction probabilities that an object in a physical environment is at a first location at a first time; determining, based at least in part on an expansion of the prediction probabilities, updated discretized probability distributions; and causing, based at least in part on the updated discretized probability distributions, an autonomous vehicle to perform an action.

G. The method of paragraph F, further comprising: determining a location of the autonomous vehicle at a point in time; and determining a likelihood of collision based at least in part on the location of the autonomous vehicle and the updated discretized probability distributions; and causing, based at least in part on the updated discretized probability distributions, the autonomous vehicle to perform the action.

H. The method of paragraph G, wherein determining the likelihood of collision is based at least in part on a center of a first disk representing the autonomous vehicle, a center of a second disk representing the autonomous vehicle, and the updated discretized probability distributions.

I. The method of paragraph H, wherein the expansion is based at least in part on a radius of the first disk or a radius of the second disk.

J. The method of paragraph G, wherein determining the first location of the autonomous vehicle at the point in time is based at least in part on a reference trajectory associated with the autonomous vehicle.

K. The method of paragraph F, wherein a probability of occupancy value of a first cell of the updated discretized probability distributions represents a larger of a first probability of occupancy of the first cell associated with the object and a second probability of occupancy of the first cell associated with a second object.

L. The method of paragraph F, wherein a probability of occupancy value of a first cell of the updated discretized probability distributions represents a sum of a first probability of occupancy of the first cell associated with the object and a second probability of occupancy of the first cell associated with a second object.

M. The method of paragraph F, wherein a probability of occupancy value of a first cell of the updated discretized probability distributions represents a sum of a first probability of occupancy of the first cell associated with the object and a second probability of occupancy of the first cell associated with the object.

N. A non-transitory computer-readable medium storing instructions that wherein the instructions, when executed, cause the one or more processors to perform operations comprising: receiving a discretized probability distribution representative of a physical environment at a first time, the discretized probability distribution representing prediction probabilities that an object in the environment is occupying a first location at the first time; generating an updated discretized probability distribution by expanding a region associated with the prediction probabilities that the object in the physical environment is occupying the first location at the first time; and causing, based at least in part on the updated discretized probability distribution, an autonomous vehicle to perform an action.

O. The non-transitory computer-readable medium of paragraph N, wherein the operations further comprise: determining, based at least in part on a center of a first disk associated with the autonomous vehicle and the updated discretized probability distribution, a likelihood of collision; and causing, based at least in part on the likelihood of collision, the autonomous vehicle to perform the action.

P. The non-transitory computer-readable medium of paragraph O, wherein expanding the prediction probabilities is based at least in part on a radius of the first disk.

Q. The non-transitory computer-readable medium of paragraph O, wherein determining the likelihood of collision based at least in part on the center of a second disk corresponding to the autonomous vehicle and the updated discretized probability distribution.

R. The non-transitory computer-readable medium of paragraph N, wherein a value of a particular cell of the discretized probability distribution is representative of the greater of a first predicted probability of a first object occupying the particular cell and a second predicted probability of a second object occupying the particular cell.

S. The non-transitory computer-readable medium of paragraph N, wherein a value of a particular cell of the discretized probability distribution is representative of an accumulation of a first predicted probability of a first object occupying the particular cell and a second predicted probability of a second object occupying the particular cell.

T. The non-transitory computer-readable medium of paragraph N, wherein: the prediction probabilities further comprise a second location of the object at the first time; and the prediction probabilities at the first time further comprises a continuous region comprising the first location and the second location.

U. An autonomous vehicle system comprising: one or more processors; and one or more non-transitory computer readable media storing instructions executable by the one or more processors, wherein the instructions, when executed, cause the autonomous vehicle to perform operations comprising: receiving sensor data from a sensor associated with the autonomous vehicle, the sensor data representative of a physical environment at a first time; determining, based at least in part on the sensor data, a heat map representing prediction probabilities that an object in the physical environment is at a second time after the first time; determining, based at least in part on the heat map, a boundary of a drivable area; and causing, based at least in part on the drivable area, the autonomous vehicle to perform an action.

V. The autonomous vehicle system of claim U, wherein determining the boundary of the drivable area further comprises: receiving a reference trajectory associated with the autonomous vehicle; determining a position of the autonomous vehicle along the reference trajectory at the second time; determining a first occupied cell perpendicular to the reference trajectory at the position; and determining, based at least in part on the first occupied cell, the boundary of the drivable area.

W. The autonomous vehicle system of claim V, wherein the operations further comprise: detecting a second occupied cell perpendicular to the autonomous vehicle at the position, the second occupied cell having a probability of occupancy that meets or exceeds a threshold, the second occupied cell on a side of the autonomous vehicle opposite the first occupied cell; and wherein determining the boundary of the drivable area is based at least in part on the second occupied cell.

X. The autonomous vehicle system of claim V, wherein the first occupied cell has a probability of occupancy that meets or exceeds a threshold.

Y. The autonomous vehicle system of claim U, wherein the operations further comprise: receiving a reference trajectory associated with the autonomous vehicle; determining a position of the autonomous vehicle along the reference trajectory at the second time; detecting a first occupied cell perpendicular to the autonomous vehicle at the position; detecting a second occupied cell perpendicular to the reference trajectory at the position; determining that an accumulation of a first probability of occupancy associated with the first occupied cell and a second probability of occupancy associated with the second occupied cell meets or exceeds a threshold; determining a boundary of a drivable area associated with the autonomous vehicle based at least in part on the first occupied cell and the second occupied cell; and wherein causing the autonomous vehicle to perform the action is based at least in part on the boundary of the drivable area.

Z. A method comprising: receiving a probability distribution representative of a physical environment at a future time, the probability distribution comprising prediction probabilities associated with an object in the physical environment is occupying a first location at the future time; receiving a reference trajectory associated with an autonomous vehicle; determining a position of the autonomous vehicle along the reference trajectory at a desired point in time; and determining, based at least in part on a probability of occupancy of a cell of the probability distribution adjacent to the position, a drivable area associated with the reference trajectory.

AA. The method of paragraph Z, wherein the cell of the probability distribution is perpendicular to the position at the desired point in time.

AB. The method of paragraph Z, wherein the cell has a probability of occupancy that meets or exceeds a threshold.

AC. The method of paragraph Z, wherein the cell is a first cell and an accumulation of a probability of occupancy associated with the first cell and a probability of occupancy associated with a second cell meets or exceeds a threshold.

AD. The method of paragraph Z, wherein the cell is a first cell and the method further comprises: determining a first probability of occupancy of the first cell that meets or exceeds a first threshold; determining a second probability of occupancy of a second cell that meets or exceeds a second threshold; generating a function based at least in part on the first probability of occupancy of the first cell and the second probability of occupancy of the second cell; and wherein the drivable area is determined based at least in part on the function.

AE. The method of paragraph Z, wherein the cell is a first cell and the method further comprises: detecting a second cell perpendicular to the reference trajectory at the position, the second cell on a side of the autonomous vehicle opposite the first cell; and wherein the drivable area is based at least in part on a location of the second cell.

AF. The method of paragraph Z, further comprising causing the autonomous vehicle to perform an action based at least in part on the drivable area.

AG. The method of paragraph Z, the probability distribution further comprises a plurality of discretized probability distributions including a first probability distribution, a second probability distribution, and a third probability distribution; the first probability distribution corresponds to a first time one interval prior a second time corresponding to the second probability distribution; and the second time is one interval prior to a third time corresponding to the third probability distribution.

AH. The method of paragraph Z, further comprising expanding the probability distribution based at least in part on a characteristic of the autonomous vehicle or a characteristic of the object.

AI. One or more non-transitory computer readable media storing instructions executable by one or more processors, wherein the instructions, when executed, cause the one or more processors to perform operations comprising: generating a discretized probability distribution representative of a physical environment at a future time, the discretized probability distribution representing prediction probabilities that an object in the physical environment is at a first location at the future time; receiving a reference trajectory associated with an autonomous vehicle; and determining a drivable area associated with the reference trajectory based at least in part on the probability distribution.

AJ. The non-transitory computer-readable medium of paragraph AI, the operations further comprise: determining a position of the autonomous vehicle along the reference trajectory at a desired point in time; and wherein the drivable area associated with the reference trajectory is based at least in part on the position.

AK. The non-transitory computer-readable medium of paragraph AJ, wherein the operations further comprise detecting a first cell of the discretized probability distribution, the first cell perpendicular to the position at the desired point in time and having a probability of occupancy that meets or exceeds a threshold.

AL. The non-transitory computer-readable medium of paragraph AJ, wherein the operations further comprise detecting a first cell of the discretized probability distribution and a second cell of the discretized probability distribution, the first cell and the second cell perpendicular to the position at the desired point in time and an accumulation of a first probability of occupancy associated with the first cell and a second probability of occupancy associated with the second cell that meets or exceeds a threshold.

AM. The non-transitory computer-readable medium of paragraph AI, wherein the operations further comprise detecting a first cell of the discretized probability distribution and a second cell of the discretized probability distribution, the first cell perpendicular to the position in a first direction and a first probability of occupancy associated with the first cell meets or exceeds a threshold and the second cell perpendicular to the position in a second direction and a second probability of occupancy associated with the second cell meets or exceeds the threshold, the second direction opposite the first direction. AN. The non-transitory computer-readable medium of paragraph AI, further comprising causing the autonomous vehicle to perform an action based at least in part on the drivable area.

While the example clauses described above are described with respect to one particular implementation, it should be understood that, in the context of this document, the content of the example clauses can also be implemented via a method, device, system, a computer-readable medium, and/or another implementation. Additionally, any of examples A-AN may be implemented alone or in combination with any other one or more of the examples A-AN.

CONCLUSION

As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples. For example, the components and instructions of FIG. 7 may utilize the processes and flows of FIGS. 1-6.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. One or more non-transitory computer readable media storing instructions executable by one or more processors, wherein the instructions, when executed, cause the one or more processors to perform operations comprising:
   generating a discretized probability distribution representative of a physical environment at a future time, the discretized probability distribution comprising a plurality of cells representative of an area in the physical environment, a first cell of the plurality of cells representing a first prediction probability that an object in the physical environment is at a first location at the future time and a second cell of the plurality of cells representing a second prediction probability that the object in the physical environment is at a second location at the future time;
   receiving a reference trajectory associated with an autonomous vehicle; and
   determining, based at least in part on the discretized probability distribution, a drivable area comprising a bounded area in the physical environment through which the reference trajectory passes and having an associated width and length,
   wherein determining the drivable area comprises performing a ray trace to determine a nearest occupied region in the physical environment.

2. The one or more non-transitory computer readable media of claim 1, wherein the operations further comprise:
   determining a position of the autonomous vehicle along the reference trajectory at a desired point in time; and
   wherein determining the drivable area is based further on the position.

3. The one or more non-transitory computer readable media of claim 2, wherein the operations further comprise determining that the first cell of the discretized probability distribution is perpendicular to the position at the desired point in time and has a probability of occupancy that meets or exceeds a threshold.

4. The one or more non-transitory computer readable media of claim 2, wherein the operations further comprise detecting the first cell of the discretized probability distribution and the second cell of the discretized probability distribution, the first cell and the second cell perpendicular to the position at the desired point in time and an accumulation of a first probability of occupancy associated with the first cell and a second probability of occupancy associated with the second cell that meets or exceeds a threshold.

5. The one or more non-transitory computer readable media of claim 2, wherein the operations further comprise detecting the first cell of the discretized probability distribution and the second cell of the discretized probability distribution, the first cell perpendicular to the position in a first direction and a first probability of occupancy associated with the first cell meets or exceeds a threshold and the second cell perpendicular to the position in a second direction and a second probability of occupancy associated with the second cell meets or exceeds the threshold, the second direction opposite the first direction.

6. The one or more non-transitory computer readable media of claim 1, further comprising causing the autonomous vehicle to perform an action based at least in part on the drivable area.

7. A method comprising:
   receiving a discretized probability distribution representative of a physical environment at a future time, the discretized probability distribution comprising a plurality of cells representative of an area in the physical environment, a first cell of the plurality of cells having a first prediction probability associated with an object in the physical environment occupying a first location at the future time and a second cell having a second prediction probability associated with the object in the physical environment occupying a second location at the future time;
   receiving a reference trajectory associated with an autonomous vehicle;
   determining a position of the autonomous vehicle along the reference trajectory at a desired point in time; and
   determining, based at least in part on at least one of the first prediction probability, the second prediction probability, and the position, a drivable area comprising a boundary and associated with the reference trajectory,
   wherein determining the drivable area comprises performing a ray trace to determine a nearest occupied region in the physical environment.

8. The method of claim 7, wherein the first cell is adjacent to the position at the desired point in time.

9. The method of claim 8, wherein the first cell is perpendicular to the position at the desired point in time.

10. The method of claim 8, wherein the first prediction probability represents a probability of occupancy that meets or exceeds a threshold.

11. The method of claim 8, wherein an accumulation of the first prediction probability and the second prediction probability meets or exceeds a threshold.

12. The method of claim 8, further comprising:
determining the first prediction probability of the first cell that meets or exceeds a first threshold;
determining the second prediction probability of a second cell that meets or exceeds a second threshold;
generating a function based at least in part on the first prediction probability of the first cell and the second prediction probability of the second cell; and
wherein the drivable area is determined based at least in part on the function.

13. The method of claim 8, further comprising:
determining that the second cell is perpendicular to the reference trajectory at the position, the second cell on a side of the autonomous vehicle opposite the first cell; and
wherein the drivable area is based at least in part on a location of the second cell.

14. The method of claim 7, wherein:
the discretized probability distribution further comprises a plurality of probability distributions including a first probability distribution, a second probability distribution, and a third probability distribution;
the first probability distribution corresponds to a first time one interval prior to a second time corresponding to the second probability distribution; and
the second time is one interval prior to a third time corresponding to the third probability distribution.

15. The method of claim 7, further comprising expanding the discretized probability distribution based at least in part on a characteristic of the autonomous vehicle or a characteristic of the object.

16. The method of claim 7, further comprising causing the autonomous vehicle to perform an action based at least in part on the drivable area.

17. An autonomous vehicle comprising:
one or more processors; and
one or more non-transitory computer readable media storing instructions executable by the one or more processors, wherein the instructions, when executed, cause the autonomous vehicle to perform operations comprising:
generating a discretized probability distribution comprising a plurality of cells representative of a physical environment at a future time, a first cell of the plurality of cells having a first probability of occupancy and a second cell of the plurality of cells having a second probability of occupancy;
receiving a reference trajectory associated with the autonomous vehicle; and
determining a drivable area associated with the reference trajectory and the future time, wherein the drivable area comprises a boundary and is based at least in part on the first probability of occupancy and the second probability of occupancy, and
further wherein determining the drivable area comprises performing a ray trace to determine a nearest occupied region of the physical environment.

18. The autonomous vehicle of claim 17, wherein determining the boundary of the drivable area further comprises:
determining a position of the autonomous vehicle along the reference trajectory at the future time;
determining that the first cell is perpendicular to the reference trajectory at the position; and
determining, based at least in part on the first cell, the boundary of the drivable area.

19. The autonomous vehicle of claim 18, wherein the operations further comprise:
determining that the second cell is perpendicular to the autonomous vehicle at the position and the second probability of occupancy meets or exceeds a threshold, the second cell on a side of the autonomous vehicle opposite the first cell; and
wherein determining the boundary of the drivable area is based at least in part on the second probability of occupancy meeting or exceeding the threshold.

20. The autonomous vehicle of claim 17, wherein the operations further comprise:
determining a position of the autonomous vehicle along the reference trajectory at the future time;
determining that the first cell is perpendicular to the autonomous vehicle at the position;
determining that the second cell is perpendicular to the reference trajectory at the position;
determining that an accumulation of the first probability of occupancy and the second probability of occupancy meets or exceeds a threshold;
determining the boundary of a drivable area based at least in part on the first cell and the second cell; and
causing the autonomous vehicle to perform an action based at least in part on the boundary of the drivable area.

\* \* \* \* \*